(12) United States Patent
Sato

(10) Patent No.: US 6,520,479 B1
(45) Date of Patent: Feb. 18, 2003

(54) FLOW RATE CONTROL VALVE

(75) Inventor: Akio Sato, Soka (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/713,305

(22) Filed: Nov. 16, 2000

(30) Foreign Application Priority Data

Nov. 16, 1999 (JP) .......................................... 11-326125

(51) Int. Cl.[7] .............................................. F16K 31/02
(52) U.S. Cl. .................................... 251/129.06; 251/84
(58) Field of Search .............................. 251/84, 129.06, 251/87

(56) References Cited

U.S. PATENT DOCUMENTS 4,995,587 A * 2/1991 Alexius ................ 251/129.06
5,417,142 A * 5/1995 Lohmann ........... 251/129.06 X

* cited by examiner

Primary Examiner—Kevin Lee
(74) Attorney, Agent, or Firm—Paul A. Guss

(57) ABSTRACT

A flow rate control valve comprises a piezoelectric actuator and a displacement amount-amplifying mechanism for amplifying a displacement amount of the piezoelectric actuator. An amplified displacement amount, which is amplified by the displacement amount-amplifying mechanism, is transmitted to a valve head. The valve head is operated to regulate a flow rate of a fluid passing through a communication passage for making communication between an inflow passage and an outflow passage of a valve body. The displacement amount-amplifying mechanism is provided with an input section and an output section which are displaceable along an axis, and a displacement-transmitting section which is tiltably displaceable by a predetermined angle.

17 Claims, 8 Drawing Sheets

FLOW RATE CONTROL VALVE

BACKGROUND OF THE INVENTION

1. Field of the Invention

The present invention relates to a flow rate control valve. In particular, the present invention relates to a flow rate control valve which constitutes, for example, a mass flow controller and which makes it possible to control the flow rate of a fluid highly accurately and stably.

2. Description of the Related Art

It is required to highly accurately control the flow rate of a process gas to be supplied to a process equipment, for example, for a thin film-forming apparatus and a dry etching apparatus used in the process for producing semiconductors. Therefore, a mass flow controller for controlling the flow rate of the process gas is inserted into a tube passage for supplying the process gas to the process equipment. In such a case, the mass flow controller is provided with a flow rate control valve which is constructed such that the flow rate is regulated depending on a value of a control voltage.

The flow rate control valve concerning the conventional technique comprises, for example, a valve body which is formed with a flow passage for the fluid, a valve head which is displaceable with respect to the valve body, for regulating the flow rate of the fluid passing through the flow passage, and an actuator which is connected to the valve head, for displacing the valve head.

Recently, realization of practical use is advanced for a flow rate control valve provided with a piezoelectric actuator as the actuator.

In general, the displacement amount, which is brought about by the piezoelectric actuator, is minute. Therefore, in the case of the flow rate control valve provided with the piezoelectric actuator as described above, it is feared that the following inconveniences arise due to shortage of the stroke of the valve head.

(1) The controllable flow rate range is minimized.

(2) Any clogging occurs due to dust or the like.

(3) When the flow rate control valve is used for the mass flow controller, the time required for maintenance based on the use of the cleaning gas (for example, nitrogen gas) is increased.

SUMMARY OF THE INVENTION

A general object of the present invention is to provide a flow rate control valve which makes it possible to increase the stroke of a valve head as compared with a flow rate control valve concerning the conventional technique.

A principal object of the present invention is to provide a flow rate control valve which makes it possible to control the flow rate of a fluid highly accurately and stably.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

At first, explanation will be made for a mass flow control system into which a flow rate control valve according to the present invention is incorporated.

Figure 1:
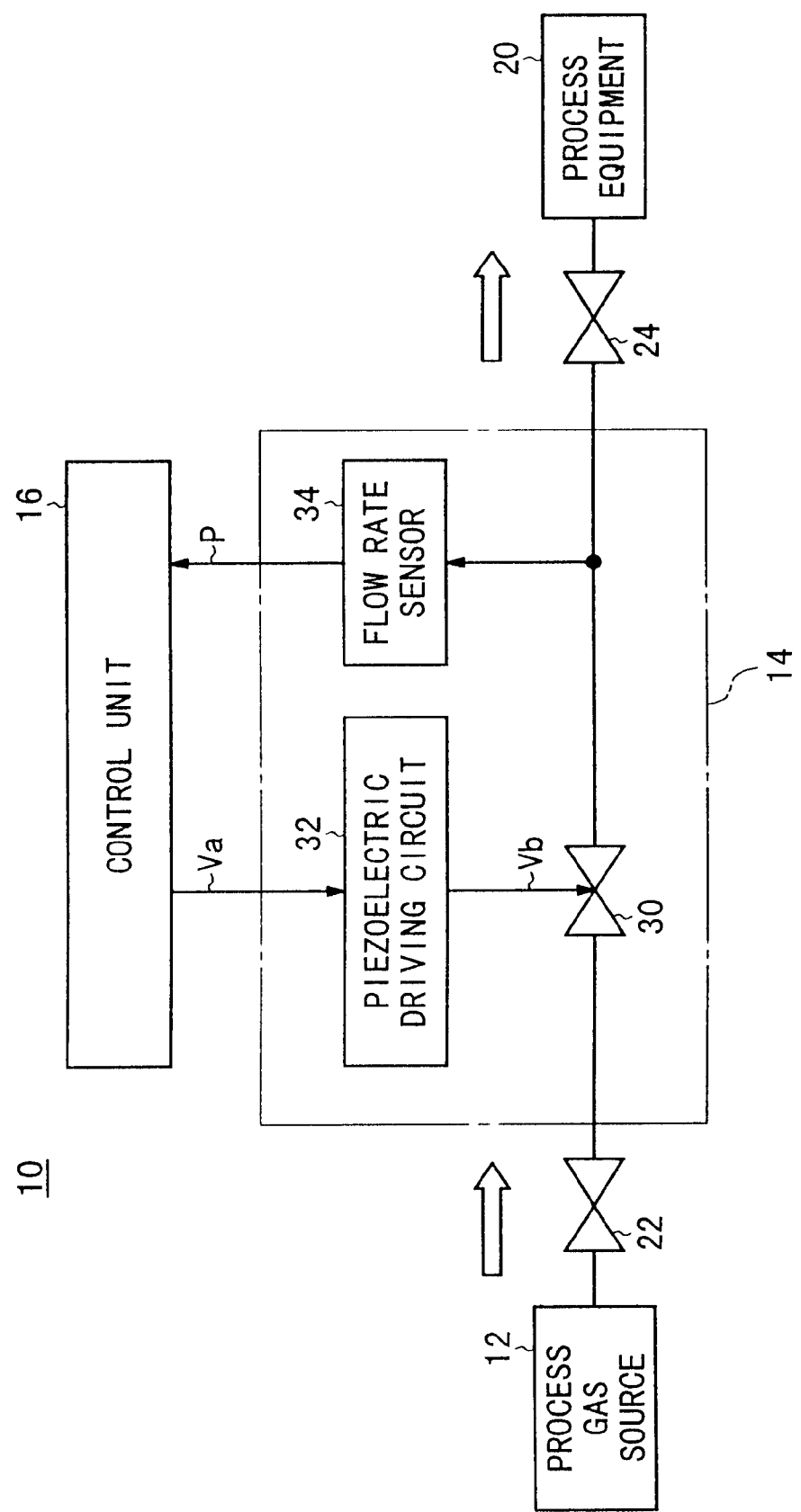
FIG. 1 shows a block diagram illustrating a schematic arrangement of a mass flow control system to which a flow rate control valve according to an embodiment of the present invention is applied.

FIG. 1 shows a schematic arrangement of a mass flow control system 10. The mass flow control system 10 comprises a process gas source 12 for feeding a process gas, a mass flow controller 14 for regulating the flow rate of the process gas fed from the process gas source 12, and a control unit 16 for controlling the mass flow controller 14. The process gas, which has passed through the mass flow controller 14, is supplied, for example, to a process equipment 20 which constitutes, for example, a thin film-forming apparatus or a dry etching apparatus used in the process for producing semiconductors.

In this arrangement, an inlet valve 22 is provided on the inlet side of the mass flow controller 14, and an outlet valve 24 is provided on the outlet side of the mass flow controller 14.

The mass flow controller 14 comprises a flow rate control valve 30 according to the embodiment of the present invention, a piezoelectric driving circuit 32 for driving the flow rate control valve 30, and a flow rate sensor 34 for detecting the flow rate P of the process gas on the downstream side of the flow rate control valve 30.

Figure 3:
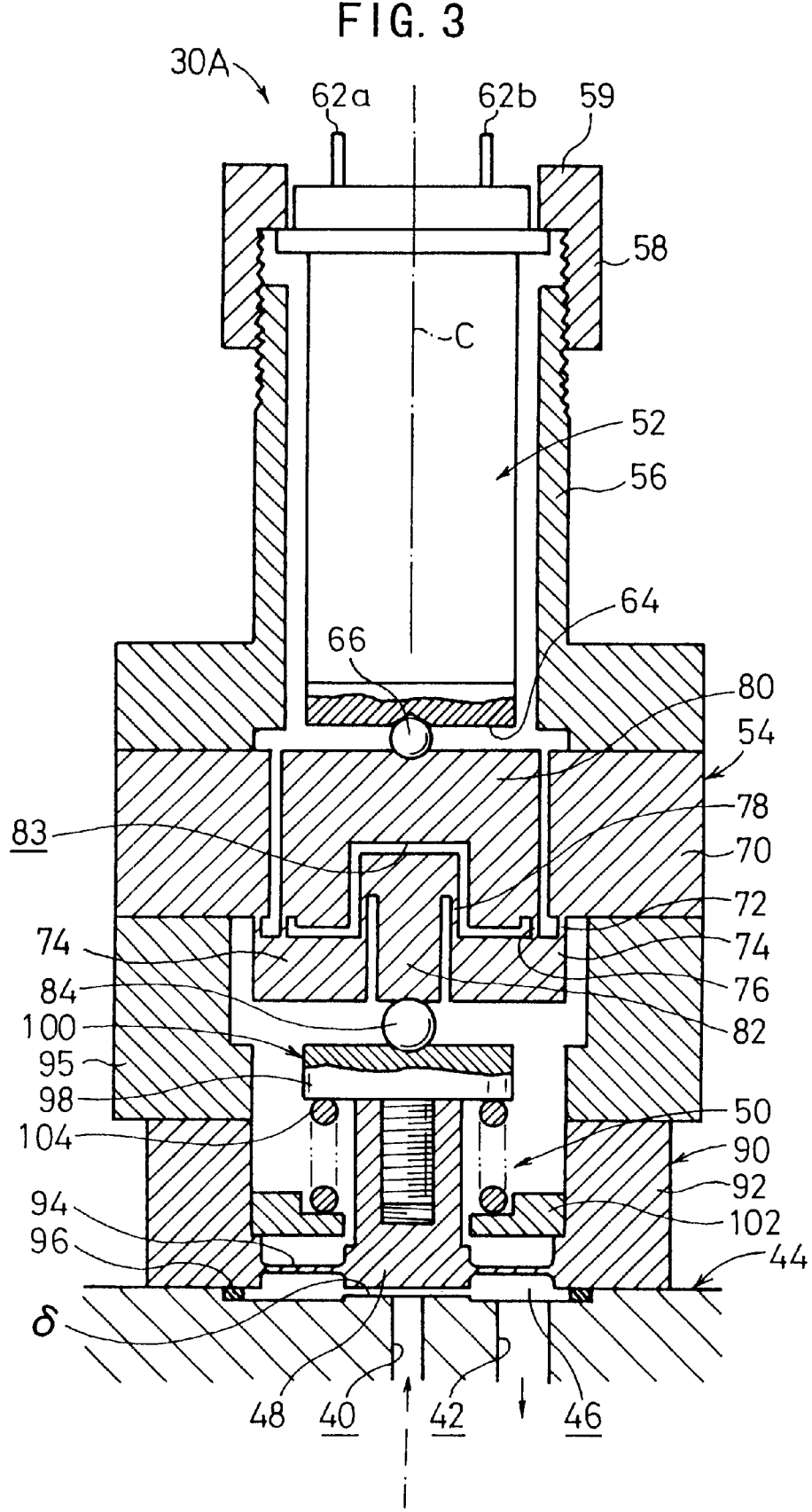
FIG. 3 shows a sectional view illustrating an arrangement of a flow rate control valve of the N/O type.
Figure 7:
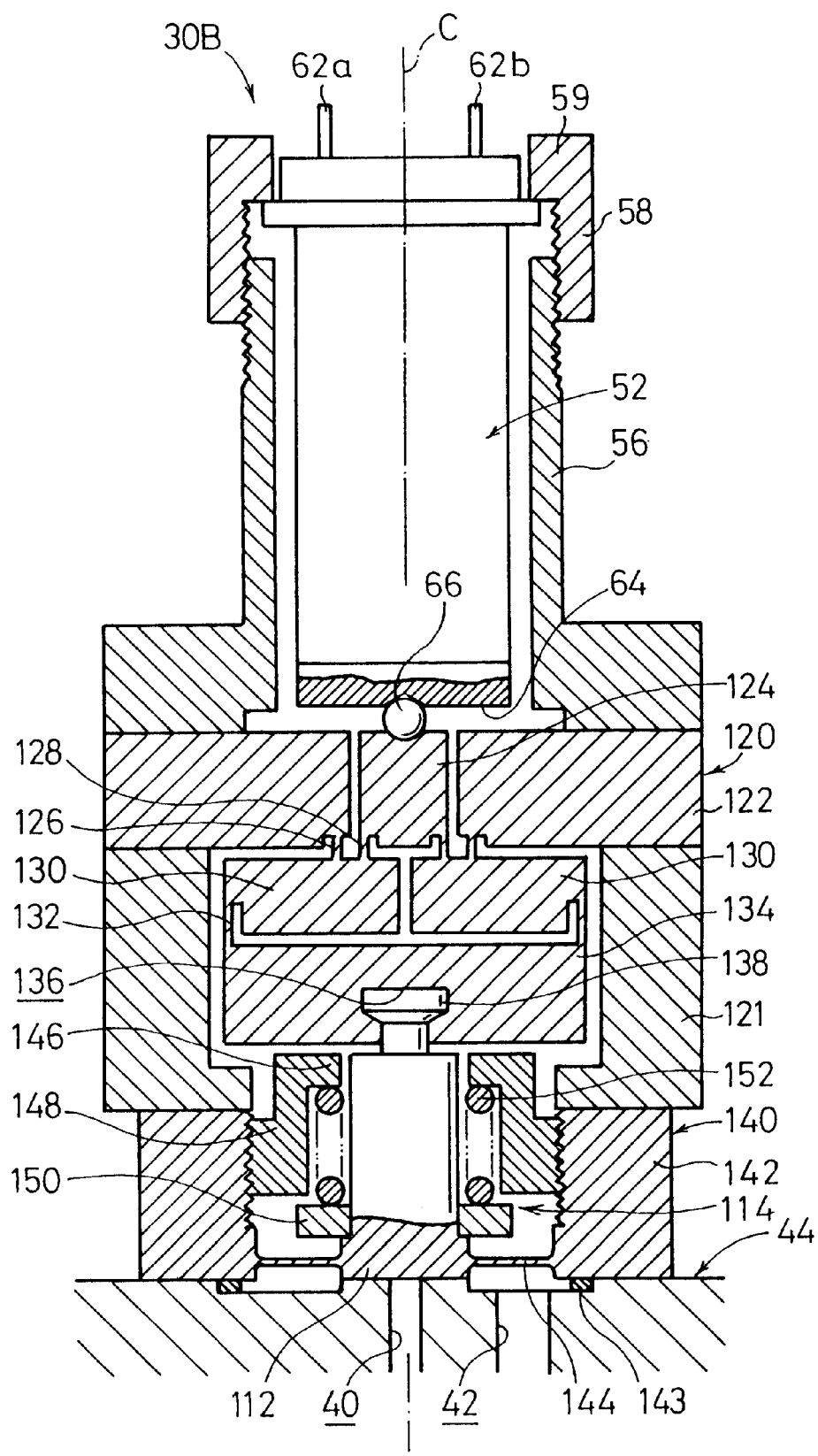
FIG. 7 shows a sectional view illustrating an arrangement of a flow rate control valve of the N/C type.

As described later on, those usable as the flow rate control valve 30 include a flow rate control valve 30A of the N/O type (normally open: in ordinary state/open) as shown in FIG. 3, and a flow rate control valve 30B of the N/C type (normally closed: in ordinary state/closed) as shown in FIG. 7.

Figure 2:
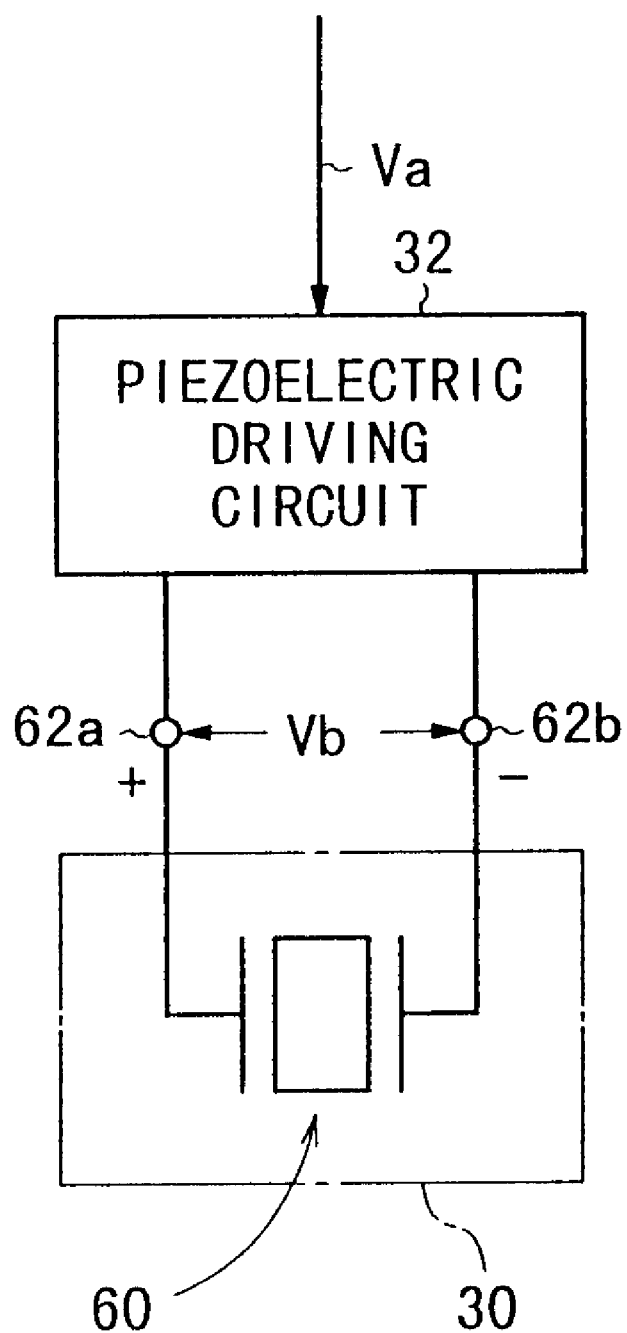
FIG. 2 shows a block diagram illustrating an arrangement of a piezoelectric driving circuit and a piezoelectric element for constructing the flow rate control valve.

FIG. 2 shows an arrangement of the piezoelectric driving circuit 32 and a piezoelectric element 60 for constructing the flow rate control valve 30 as described later on. When an unbalanced input Va as a voltage value is supplied from the control unit 16, the piezoelectric driving circuit 32 amplifies the unbalanced input Va to make an output as a balanced output (differential output) Vb. The balanced output Vb is applied between terminals 62a, 62b of the piezoelectric element 60 which constitutes the flow rate control valve 30, in accordance with which the piezoelectric element 60 is driven.

As shown in FIG. 1, the flow rate sensor 34 supplies, in a feedback manner, the detected flow rate P of the process gas to the control unit 16. The control unit 16 regulates the value of the unbalanced input Va to be supplied to the piezoelectric driving circuit 32, on the basis of the flow rate P. The piezoelectric driving circuit 32 drives the flow rate control valve 30 on the basis of the unbalanced input Va. That is, the control unit 16 controls the flow rate control valve 30 by the aid of the piezoelectric driving circuit 32.

Next, the flow rate control valve 30A of the N/O type according to the embodiment of the present invention will be explained.

FIG. 3 shows an arrangement of the flow rate control valve 30A. As shown in FIG. 3, the flow rate control valve 30A comprises a valve body 44 which is formed with an inflow passage 40 and an outflow passage 42 for the fluid (process gas), a valve mechanism 50 which has a valve head 48 for changing the cross-sectional area of a communication passage 46 for making communication between the inflow passage 40 and the outflow passage 42 to regulate the flow rate of the process gas, a piezoelectric actuator 52 as a driving source for driving the valve head 48, and a displacement amount-amplifying mechanism 54 for amplifying the displacement amount La of the piezoelectric actuator 52.

The piezoelectric actuator 52 is inserted into a hollow frame member 56 which is arranged on the upper side of the flow rate control valve 30A as shown in FIG. 3. The piezoelectric actuator 52 is attached to the frame member 56 by the aid of a nut-shaped member 58 which is installed to an upper end of the frame member 56. Specifically, the piezoelectric actuator 52 is interposed and fixed between the displacement amount-amplifying-mechanism 54 (ball 66) and a flange section 59 provided for the nut-shaped member 58.

The piezoelectric actuator 52 includes, for example, the stacked type piezoelectric element 60 at the inside thereof (see FIG. 2). The piezoelectric actuator 52 is displaced in a direction of a forward end 64 (in the downward direction along the axis C of the flow rate control valve 30A as shown in FIG. 3) in the displacement amount La corresponding to the balanced output Vb which is applied to the piezoelectric element 60 from the piezoelectric driving circuit 32 via the terminals 62a, 62b. That is, the piezoelectric actuator 52 is constructed as an electricity/displacement conversion mechanism. Alternatively, the electricity/displacement conversion mechanism may be constructed by using a magnetostrictive element (super magnetostrictive element).

As shown in FIG. 3, the forward end 64 of the piezoelectric actuator 52 contacts with an upper end of an input section 80 which constitutes the displacement amount-amplifying mechanism 54 as described later on, with the ball 66 intervening therebetween. The displacement amount La, which is brought about by the piezoelectric actuator 52, is transmitted to the input section 80.

The displacement amount-amplifying mechanism 54 includes a support section 70, and it is assembled to the frame member 56 by the aid of the support section 70.

The displacement amount-amplifying mechanism 54 comprises a displacement-transmitting section (tilting section) 74 which is connected to the support section 70 via support point sections 72, an input section 80 which is arranged in a hole of the support section 70 and which is connected to the displacement-transmitting section 74 via input point sections 76, and an output section 82 which is connected to the displacement-transmitting section 74 via output point sections 78.

The displacement-transmitting section 74 is arranged under the input section 80. The displacement-transmitting section 74 is divided into left and right portions as shown in FIG. 3 (or it is divided and arranged in a substantially ring-shaped conformation). The support point section 72, the input point section 76, and the output point section 78 are connected to each of the divided portions of the displacement-transmitting section 74 respectively.

Figure 4:
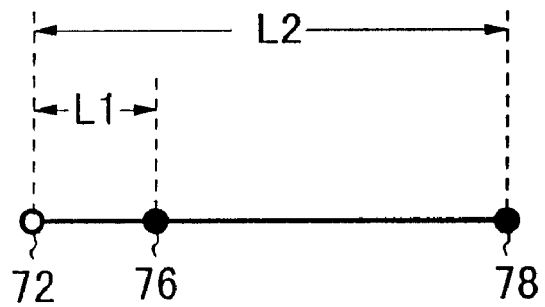
FIGS. 4 and 5 illustrate the operation of a displacement amount-amplifying mechanism which constitutes the flow rate control valve shown in FIG. 3.

In this arrangement, the support point section 72, the input point section 76, and the output point section 78 are provided so that they are aligned in an order of the support point section 72, the input point section 76, and the output point section 78 toward the axis C from the position most separated from the axis C. As shown in FIG. 4, the angle of intersection between a straight line for. connecting the input point section 76 and the support point section 72 and a straight line for connecting the output point section 78 and the support point section 72 is smaller than 90 degrees, and it is substantially zero degree.

As shown in FIG. 3, a recess 83 is formed at a substantially central portion of the lower end of the input section 80. The upper end of the output section 82 is accommodated in the recess 83. The output section 82 is arranged between the portions of the displacement-transmitting section 74. The lower end of the output section 82 contacts with a spring-pressing member 100 which constitutes the valve mechanism 50 as described later on, with a ball 84 intervening therebetween.

The support point section 72, the input point section 76, and the output point section 78 are formed to have thin-walled configurations so that they may be easily deformed respectively. On the other hand, the support section 70, the displacement-transmitting section 74, the input section 80, and the output section 82 are formed to have thick-walled configurations so that they are not deformed with ease.

The support section 70, the displacement-transmitting section 74, the input section 80, and the output section 82 as well as the support point sections 72, the input point sections 76, and the output point sections 78 are formed so that they are symmetric with respect to the axis C. Further, the support section 70, the input section 80, the displacement-transmitting section 74, and the output section 82 as well as the support point sections 72, the input point sections 76, and the output point sections 78 are made of, for example, a metal material or a resin material (metal material in the embodiment shown in FIG. 3) in an integrated manner or in a separate manner.

Figure 6:
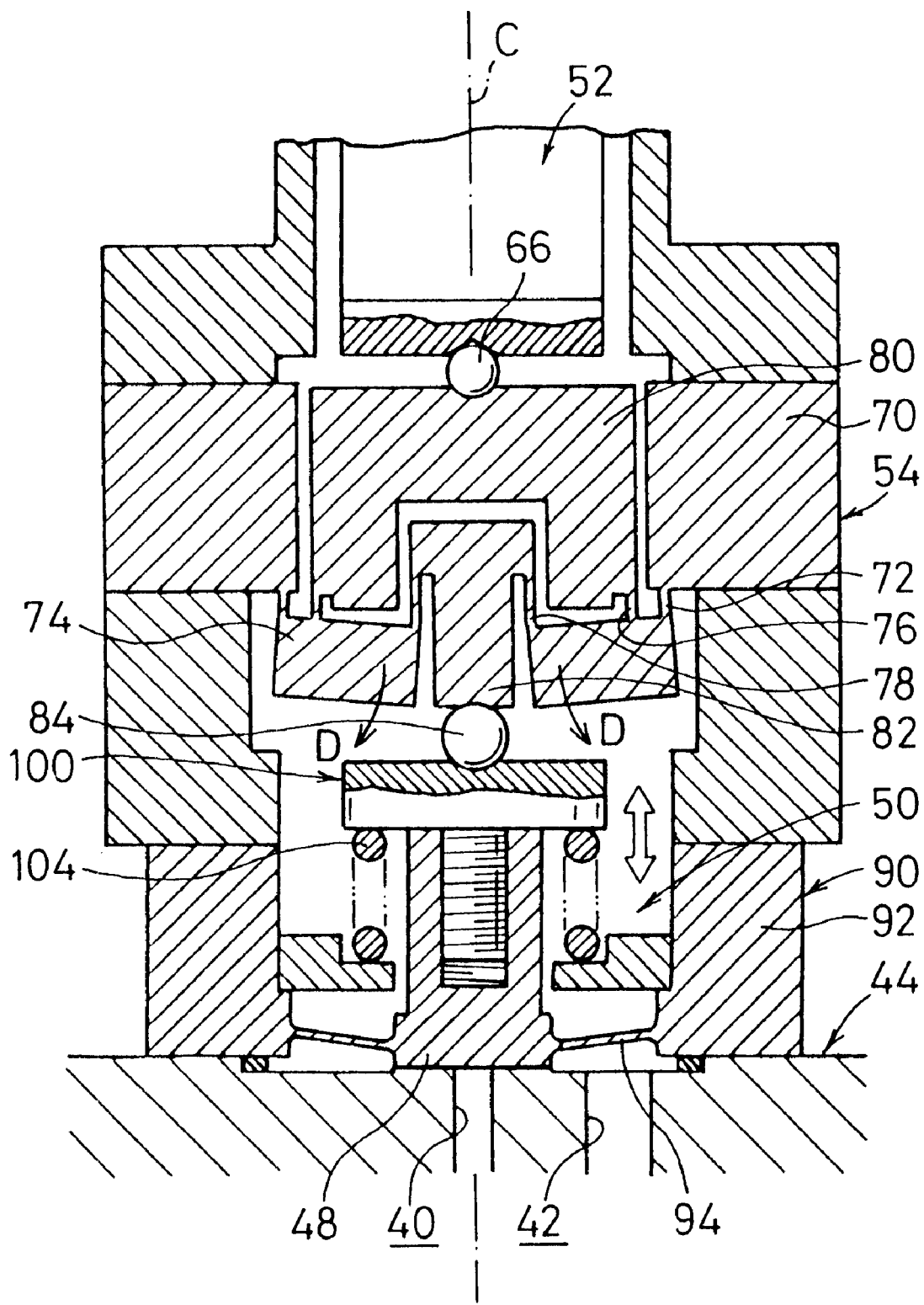
FIG. 6 shows, with partial omission, a sectional view illustrating the operation of the flow rate control valve shown in FIG. 3.

As shown in FIG. 6, when the displacement of the piezoelectric actuator 52 is transmitted to the input section 80, the input section 80 is displaced downwardly along the axis C. The input section 80 presses the displacement-transmitting section 74 downwardly by the aid of the input point sections 76. During this process, each of the portions of the displacement-transmitting section 74 is tilted (rotated) by a predetermined angle in the direction of the arrow D about the center of the support point section 72. In this arrangement, the tilting directions (rotational directions) of the divided portions of the displacement-transmitting section 74 are symmetric with respect to the axis C, because the positions of the support point sections 72 and the input point sections 76 are symmetric with respect to the axis C.

The tilted portions of the displacement-transmitting section 74 push the output section 82 downwardly by the aid of the output point sections 78. As a result, the output section 82 is displaced downwardly along the axis C, because of the following reason. That is, the positions, at which the output point sections 78 of the output section 82 are connected, are symmetric positions with respect to the axis C. In other words, the displacement amount-amplifying mechanism 54 functions to transmit the displacement of the piezoelectric actuator 52 linearly in the identical direction along the axis C.

As shown in FIG. 4, it is assumed that the distance from the support point section 72 to the input point section 76 is an input distance L1, and the distance from the support point section 72 to the output point section 78 is an output distance L2. A relationship of L1<L2 holds between the input distance L1 and the output distance L2.

The input distance L1 can be also obtained as a distance between virtual lines which pass through the support point section 72 and the input point section 76 respectively and which are parallel to the axis C. The output distance L2 can be also obtained as a distance between virtual lines which pass through the support point section 72 and the output point section 78 respectively and which are parallel to the axis C.

Figure 5:
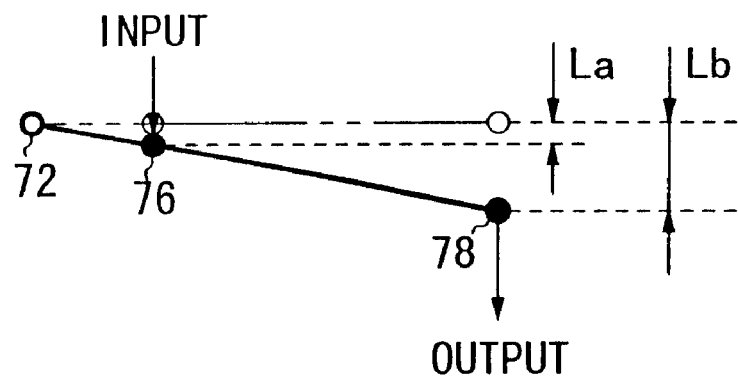

As shown in FIG. 5, when the input section 80 is displaced downwardly by the displacement amount La (displacement amount of the piezoelectric actuator 52), the output section 82 is displaced downwardly by a displacement amount (amplified displacement amount) Lb which is L2/L1 times the displacement amount La. That is, the displacement amount-amplifying mechanism 54 functions to amplify the displacement amount La inputted into the input section 80 at an amplification factor of L2/L1-fold by the aid of the displacement-transmitting section 74 to make output as the amplified displacement amount Lb.

As shown in FIG. 3, the valve mechanism 50 has a valve member 90 which is provided with the valve head 48. The valve member 90 is integrally formed by a frame section 92 and the valve head 48 which is connected to the frame section 92 by the aid of a diaphragm section 94. In this arrangement, the frame section 92, the diaphragm section 94, and the valve head 48 are formed to be symmetric with respect to the axis C.

It is preferable that a metal or the like having corrosion resistance (for example, SUS316L based on the JIS standard) is adopted as a material for the valve member 90 in order to make it possible to correspond to a corrosive gas.

The frame section 92 is assembled to the support section 70 of the displacement amount-amplifying mechanism 54 by the aid of a hollow frame member 95 which is arranged on the upper side of the frame section 92. The frame section 92 is also assembled to the valve body 44 which is arranged on the lower side of the frame section 92. The space between the frame section 92 and the valve body 44 is tightly closed by an O-ring 96.

A spring-pressing member 100, which is provided with a flange section 98, is attached to the valve head 48. A flange-shaped spring support member 102 is attached to the frame section 92. In this arrangement, the shapes of the spring-pressing member 100 and the spring support member 102 are symmetric with respect to the axis C respectively.

An elastic member (for example, a spring) 104 is provided between the flange section 98 of the spring-pressing member 100 and the spring support member 102. The spring-pressing member 100 receives the force in the upward direction along the axis C exerted by the elastic member 104. A central portion of the spring-pressing member 100 contacts with the lower end of the output section 82 which constitutes the displacement amount-amplifying mechanism 54, with the ball 84 intervening therebetween.

Accordingly, a gap δ is formed between the valve head 48 and the valve body 44 in a state in which no displacement is generated in the piezoelectric actuator 52. In this arrangement, the gap δ functions as the communication passage 46 for making communication between the inflow passage 40 and the outflow passage 42.

As shown in FIGS. 5 and 6, when the displacement of the displacement amount La is generated in the piezoelectric actuator 52, and the displacement amount La is amplified by the displacement amount-amplifying mechanism 54 to be transmitted as the amplified displacement amount Lb to the valve head 48, then the valve head 48 is displaced in the vertical direction along the axis C while reacting against the resilient force of the elastic member 104 or while being pressed and returned by the elastic member 104. During this process, the cross-sectional area of the communication passage 46 is changed depending on the magnitude of the amplified displacement amount Lb. As a result, the flow rate of the process gas passing through the communication passage 46 is regulated.

As shown in FIG. 6, when the valve head 48 is further displaced in the downward direction, and it is allowed to forcibly abut against the upper end of the valve body 44 as the seat section, then the upper end of the inflow passage 40 is clogged by the valve head 48. Accordingly, the space between the inflow passage 40 and the outflow passage 42 is closed. That is, the flow rate control valve 30A is in the closed state.

Next, the flow rate control valve 30B of the N/C type according to the embodiment of the present invention will be explained.

FIG. 7 shows an arrangement of the flow rate control valve 30B. As shown in FIG. 7, the flow rate control valve 30B comprises a valve body 44, a valve mechanism 114 which has a valve head 112, a piezoelectric actuator 52, and a displacement amount-amplifying mechanism 120. The valve body 44 and the piezoelectric actuator 52 as well as the frame member 56 and the nut-shaped member 58 are constructed in the same manner as those of the flow rate control valve 30A shown in FIG. 3, which are designated by the same reference numerals and detailed explanation of which will be omitted.

The displacement amount-amplifying mechanism 120 comprises a support section 122 which is interposed between the frame member 56 arranged thereover and a frame member 121 arranged thereunder and which is assembled to the frame member 56 and the frame member 121, an input section 124 which is arranged between the support section 122, a displacement-transmitting section (tilting section) 130 which is connected to the support section 122 and the input section 124 via support point sections 126 and input point sections 128 respectively, and an output section 134 which is connected to the displacement-transmitting section 130 via output point sections 132.

The displacement-transmitting section 130 is arranged under the support section 122 and the input section 124. The output section 134 is arranged under the displacement-transmitting section 130.

The displacement-transmitting section 130 is divided into left and right portions as shown in FIG. 7 (or it is divided and arranged in a substantially ring-shaped conformation). The support point section 126, the input point section 128, and the output point section 132 are connected to each of the divided portions of the displacement-transmitting section 130 respectively.

Figure 8:
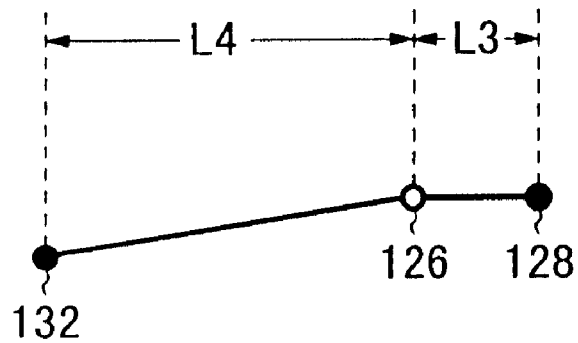
FIGS. 8 and 9 illustrate the operation of a displacement amount-amplifying mechanism which constitutes the flow rate control valve shown in FIG. 7.

In this arrangement, the support point section 126, the input point section 128, and the output point section 132 are aligned in an order of the output point section 132, the support point section 126, and the input point section 128 toward the axis C from the position most separated from the axis C. As shown in FIG. 8, the angle of intersection between a straight line for connecting the output point section 132 and the support point section 126 and a straight line for connecting the input point section 128 and the support point section 126 is larger than 90 degrees, and it has a value close to 180 degrees.

As shown in FIG. 7, the support point section 126, the input point section 128, and the output point section 132 are formed to have thin-walled configurations so that they may be easily deformed respectively. On the other hand, the support section 122, the input section 124, the displacement-transmitting section 130, and the output section 134 are formed to have thick-walled configurations so that they are not deformed with ease.

The support section 122, the input section 124, the displacement-transmitting section 130, and the output section 134 as well as the support point sections 126, the input point sections 128, and the output point sections 132 are formed so that they are symmetric with respect to the axis C. Further, the support section 122, the input section 124, the displacement-transmitting section 130, and the output section 134 as well as the support point sections 126, the input point sections 128, and the output point sections 132 are made of, for example, a metal material or a resin material (metal material in the embodiment shown in FIG. 7) in an integrated manner or in a separate manner.

The upper end of the input section 124 contacts with the forward end 64 of the piezoelectric actuator 52 with the ball 66 intervening therebetween. A cutout 136 having a substantially T-shaped cross section is formed at a lower end portion of the output section 134. A projection 138 having substantially the same shape as that of the cutout 136, which is formed at the upper end of the valve head 112, is fitted to the cutout 136. The output section 134 and the valve head 112 are connected to one another by fitting the projection 138 to the cutout 136 as described above.

Figure 10:
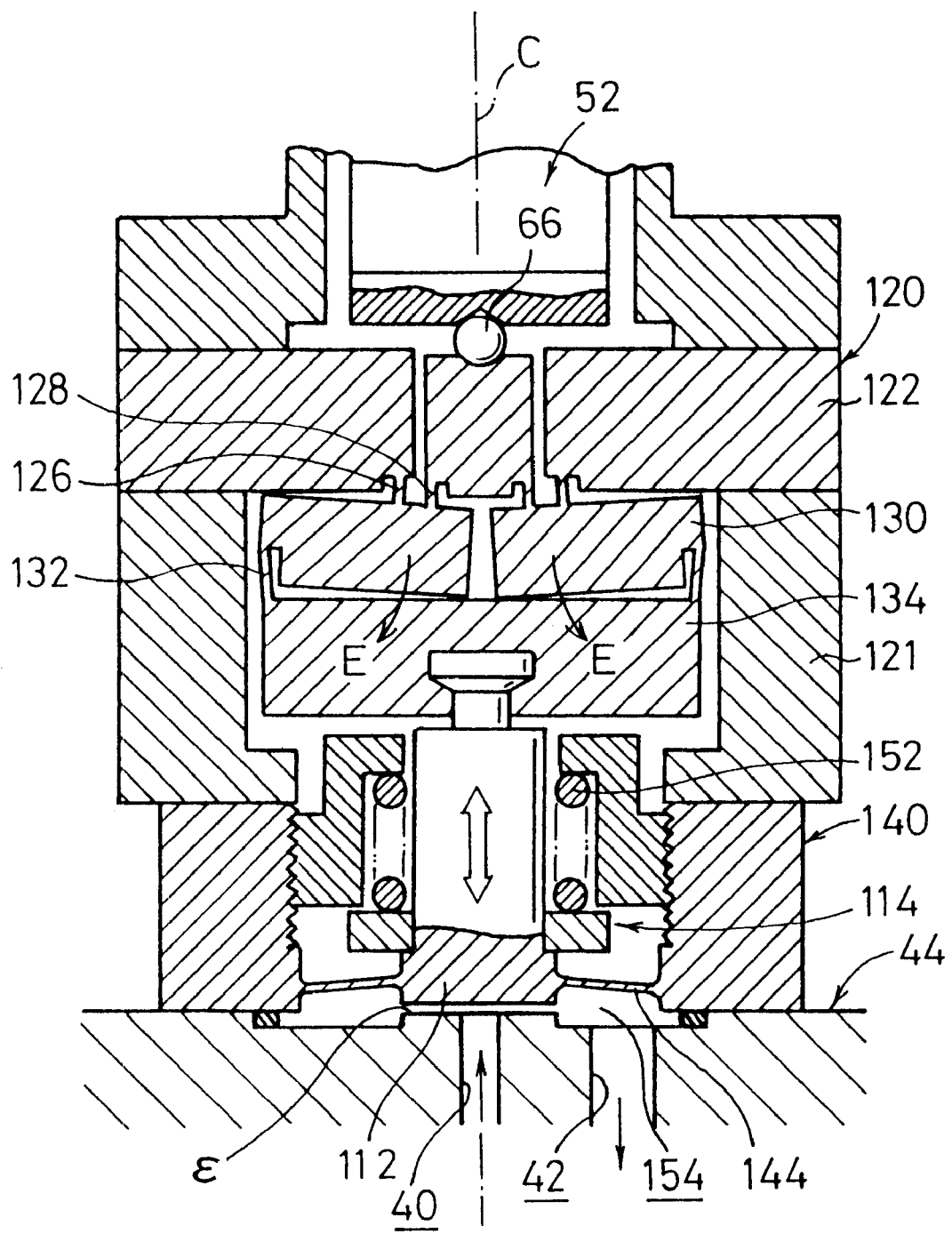
FIG. 10 shows, with partial omission, a sectional view illustrating the operation of the flow rate control valve shown in FIG. 7.

As shown in FIG. 10, when the displacement of the piezoelectric actuator 52 is transmitted to the input section 124, the input section 124 is displaced downwardly along the axis C. The input section 124 presses the displacement-transmitting section 130 downwardly by the aid of the input point sections 128. During this process, each of the portions of the displacement-transmitting section 130 is tilted (rotated) by a predetermined angle in the direction of the arrow E about the center of the support point section 126. In this arrangement, the tilting directions (rotational directions) of the divided portions of the displacement-transmitting section 130 are symmetric with respect to the axis C, because the positions of the support point sections 126 and the input point sections 128 are symmetric with respect to the axis C.

The tilted portions of the displacement-transmitting section 130 pull the output section 134 upwardly by the aid of the output point sections 132. As a result, the output section 134 is displaced upwardly along the axis C, because of the following reason. That is, the positions, at which the output point sections 132 of the output section 134 are connected, are symmetric positions with respect to the axis C. In other words, the displacement amount-amplifying mechanism 120 functions to convert the displacement of the piezoelectric actuator 52 to be in the opposite direction and transmit the displacement of the piezoelectric actuator 52 linearly along the axis C.

As shown in FIG. 8, it is assumed that the dimensional component in the direction perpendicular to the axis C concerning a line segment for connecting the support point section 126 and the input point section 128 of the displacement-transmitting section 130 is designated as the input distance L3, and the dimensional component in the direction perpendicular to the axis C concerning a line segment for connecting the support point section 126 and the output point section 132 is designated as the output distance L4. A relationship of L3<L4 holds between the input distance L3 and the output distance L4.

The input distance L3 can be also obtained as a distance between virtual lines which pass through the support point section 126 and the input point section 128 respectively and which are parallel to the axis C. The output distance L4 can be also obtained as a distance between virtual lines which pass through the support point section 126 and the output point section 132 respectively and which are parallel to the axis C.

Figure 9:
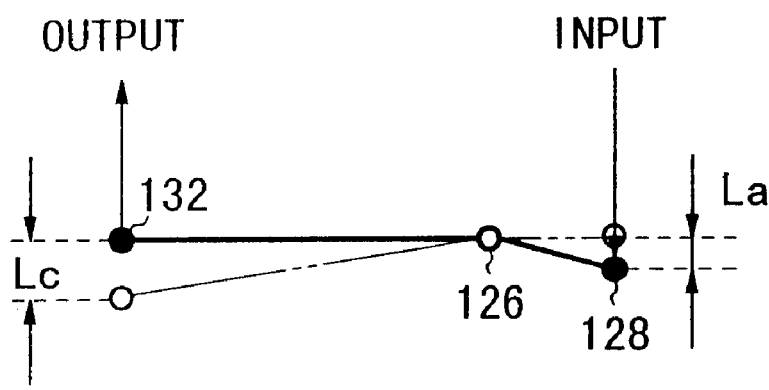

As shown in FIG. 9, when the input section 124 is displaced downwardly by the displacement amount La (displacement amount of the piezoelectric actuator 52), the output section 134 is displaced upwardly by a displacement amount (amplified displacement amount) Lc which is L4/L3 times the displacement amount La. That is, the displacement amount-amplifying mechanism 120 functions to amplify the displacement amount La inputted into the input section 124 at an amplification factor of L4/L3-fold by the aid of the displacement-transmitting section 130 to make output as the amplified displacement amount Lc.

As shown in FIG. 7, the valve mechanism 114 has a valve member 140 which is provided with the valve head 112. The valve member 140 is integrally formed by a frame section 142 and the valve head 112 which is connected to the frame section 142 by the aid of a diaphragm section 144. In this arrangement, the frame section 142, the diaphragm section 144, and the valve head 112 are formed to be symmetric with respect to the axis C.

It is preferable that a metal or the like having corrosion resistance (for example, SUS316L based on the JIS standard) is adopted as a material for the valve member 140.

The frame section 142 is assembled to the support section 122 of the displacement amount-amplifying mechanism 120 by the aid of a frame member 121 which is arranged on the upper side of the frame section 142. The frame section 142 is also assembled to the valve body 44 which is arranged on the lower side of the frame section 142. The space between the frame section 142 and the valve body 44 is tightly closed by an O-ring 143.

A spring support member 148, which is provided with a flange section 146, is attached to the frame section 142. A flange-shaped spring-pressing member 150 is attached to the valve head 112. In this arrangement, the shapes of the spring support member 148 and the spring-pressing member 150 are symmetric with respect to the axis C respectively.

An elastic member (for example, a spring) 152 is provided between the flange section 146 of the spring support member 148 and the spring-pressing member 150. The spring-pressing member 150 receives the force in the downward direction along the axis C exerted by the elastic member 152. Accordingly, the valve head 112 is allowed to forcibly abut against the upper end of the valve body 44 as the valve seat section in a state in which no displacement is generated in the piezoelectric actuator 52. Thus, the space between the inflow passage 40 and the outflow passage 42 is closed.

As shown in FIGS. 9 and 10, when the displacement of the displacement amount La is generated in the piezoelectric actuator 52, and the displacement amount La is amplified by the displacement amount-amplifying mechanism 120 to be transmitted as the amplified displacement amount Lc to the valve head 112 with the direction being converted, then the valve head 112 is displaced in the upward direction along the axis C while reacting against the resilient force of the elastic member 152. On the other hand, when the displacement amount La is decreased, then the valve head 112 is pulled and returned by the elastic member 152, and it is displaced in the downward direction along the axis C.

That is, the gap ϵ is formed between the valve head 112 and the valve body 44 in accordance with the displacement of the valve head 112. The gap ϵ functions as a communication passage 154 for making communication between the inflow passage 40 and the outflow passage 42. During this process, the cross-sectional area of the communication passage 154 is changed depending on the magnitude of the amplified displacement amount Lc. As a result, the flow rate of the process gas passing through the communication passage 154 is regulated.

As described above, the flow rate control valve 30A of the N/O type and the flow rate control valve 30B of the N/C type according to the embodiment of the present invention are constructed such that the minute displacement amount La, which is brought about by the piezoelectric actuator 52, is amplified to be transmitted to the valve head 48 and the valve head 112. Therefore, it is possible to increase the strokes of the valve head 48 and the valve head 112.

The flow rate control valve 30A and the flow rate control valve 30B are constructed by using the valve body 44 having the identical structure. Therefore, it is possible to produce the two types of the flow rate control valve 30A and the flow rate control valve 30B at low cost.

The displacement amount-amplifying mechanism 54 and the displacement amount-amplifying mechanism 120 are constructed so that the displacement of the piezoelectric actuator 52 is converted in the identical direction or in the opposite direction respectively. Accordingly, both of the flow rate control valve 30A of the N/O type and the flow rate control valve 30B of the N/C type can be constructed by using the piezoelectric actuator 52 which is displaced in one direction. Therefore, it is possible to produce the two types of the flow rate control valve 30A and the flow rate control valve 30B at further low cost.

The valve body 44, which is used to construct the flow rate control valve 30A and the flow rate control valve 30B, has the simple structure of the gas-contacting portions including, for example, the inflow passage 40 and the outflow passage 42. Therefore, it is possible to decrease the contact area with respect to the process gas.

Further, the flow rate of the fluid can be controlled highly accurately and stably by using the flow rate control valve 30A and the flow rate control valve 30B constructed as described above.

What is claimed is:

1. A flow rate control valve comprising:
   a valve body formed with a flow passage for a fluid;
   a valve head for making displacement with respect to said valve body to regulate a flow rate of said fluid passing through said flow passage;
   an electricity/displacement conversion mechanism for making displacement in a displacement amount corresponding to a value of a current or a voltage in accordance with supply of said current or said voltage;
   a displacement amount-amplifying mechanism comprising a tilting section tiltable by an angle about a support point for amplifying said displacement amount from said electricity/displacement conversion mechanism to be transmitted to said valve head.

2. The flow rate control valve according to claim 1, wherein said tilting section is tiltable by said angle about a center of said support point, which receives said displacement amount from said electricity/displacement conversion mechanism at an input point, and which applies an amplified displacement amount to said valve head at an output point.

3. The flow rate control valve according to claim 2, wherein said displacement amount-amplifying mechanism has a function to convert a direction of said displacement brought about by said electricity/displacement conversion mechanism.

4. The flow rate control valve according to claim 3, wherein:
   said direction of said displacement brought about by said electricity/displacement conversion mechanism is substantially parallel to a movement direction of said valve head; and
   said displacement amount-amplifying mechanism transmits said displacement to said valve head, while maintaining said direction of said displacement of said electricity/displacement conversion mechanism in an identical direction or converting said direction of said displacement of said electricity/displacement conversion mechanism into an opposite direction, depending on a positional relationship between said input point and said output point with respect to said support point.

5. The flow rate control valve according to claim 4, wherein:
   said displacement amount-amplifying mechanism amplifies said displacement amount with a predetermined amplification factor; and
   said amplification factor is determined by a ratio between a distance between lines which pass through said support point and said input point respectively and which are parallel to said movement direction of said valve head and a distance between lines which pass through said support point and said output point respectively and which are parallel to said movement direction of said valve head.

6. The flow rate control valve according to claim 1, wherein said electricity/displacement conversion mechanism is a piezoelectric actuator.

7. The flow rate control valve according to claim 1, wherein said flow rate control valve constitutes a mass flow controller.

8. The flow rate control valve according to claim 2, wherein said displacement amount-amplifying mechanism includes a displacement-transmitting section which is connected to a support section via support point sections, an input section which is arranged in a hole of said support section and which is connected to said displacement-transmitting section via input point sections, and an output section which is connected to said displacement-transmitting section via output point sections, and said output section is provided to make contact with a valve mechanism with a ball intervening therebetween.

9. The flow rate control valve according to claim 2, wherein a cutout having a substantially T-shaped cross section is formed at one end of an output section of said displacement amount-amplifying mechanism, and said output section and said valve head are connected to one another by the aid of a projection fitted to said cutout.

10. A flow rate control valve comprising:
    a valve body formed with a flow passage for a fluid;

a valve head for making displacement with respect to said valve body to regulate a flow rate of said fluid passing through said flow passage;

an electricity/displacement conversion mechanism for making displacement in a displacement amount corresponding to a value of a current or a voltage in accordance with supply of said current or said voltage;

a non-hydraulically actuated displacement amount-amplifying means for amplifying said displacement amount from said electricity/displacement conversion mechanism to be transmitted to said valve head, wherein said displacement amount-amplifying means comprises a tilting section which is tiltable by a predetermined angle about a center of a support point, which receives said displacement amount from said electricity/displacement conversion mechanism at an input point, and which applies an amplified displacement amount to said valve head at an output point.

11. The flow rate control valve according to claim 10, wherein said displacement amount-amplifying means functions to convert a direction of said displacement brought about by said electricity/displacement conversion mechanism.

12. The flow rate control valve according to claim 11, wherein:

said direction of said displacement brought about by said electricity/displacement conversion mechanism is substantially parallel to a movement direction of said valve head; and said displacement amount-amplifying means transmits said displacement to said valve head, while maintaining said direction of said displacement of said electricity/displacement conversion mechanism in an identical direction or converting said direction of said displacement of said electricity/displacement conversion mechanism into an opposite direction, depending on a positional relationship between said input point and said output point with respect to said support point.

13. The flow rate control valve according to claim 12, wherein:

said displacement amount-amplifying means amplifies said displacement amount with a predetermined amplification factor; and said amplification factor is determined by a ratio between a distance between lines which pass through said support point and said input point respectively and which are parallel to said movement direction of said valve head and a distance between lines which pass through said support point and said output point respectively and which are parallel to said movement direction of said valve head.

14. The flow rate control valve according to claim 10, wherein said electricity/displacement conversion mechanism is a piezoelectric actuator.

15. The flow rate control valve according to claim 10, wherein said flow rate control valve constitutes a mass flow controller.

16. The flow rate control valve according to claim 10, wherein said displacement amount-amplifying means includes a displacement-transmitting section which is connected to a support section via support point sections, an input section which is arranged in a hole of said support section and which is connected to said displacement-transmitting section via input point sections, and an output section which is connected to said displacement-transmitting section via output point sections, and said output section is provided to make contact with a valve mechanism with a ball intervening therebetween.

17. The flow rate control valve according to claim 10, wherein a cutout having a substantially T-shaped cross section is formed at one end of an output section of said displacement amount-amplifying means, and said output section and said valve head are connected to one another by the aid of a projection fitted to said cutout.

* * * * *